June 13, 1933. E. S. CROWL 1,914,008
PUMPING UNIT
Filed July 30, 1932
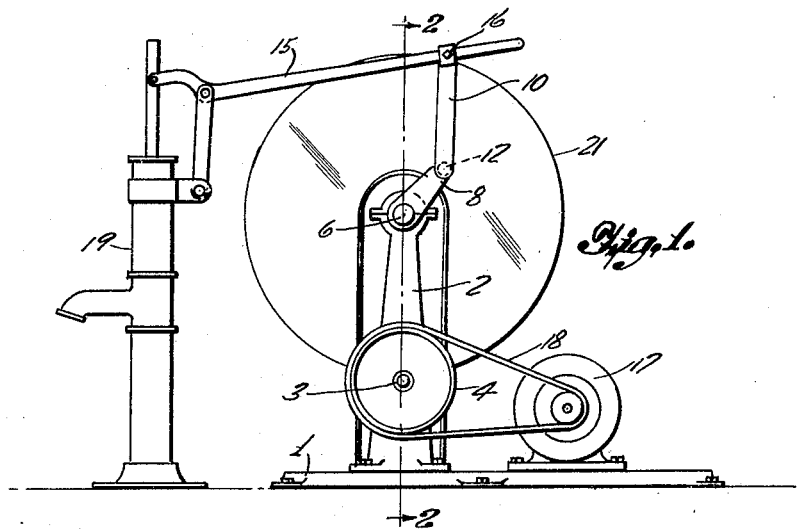
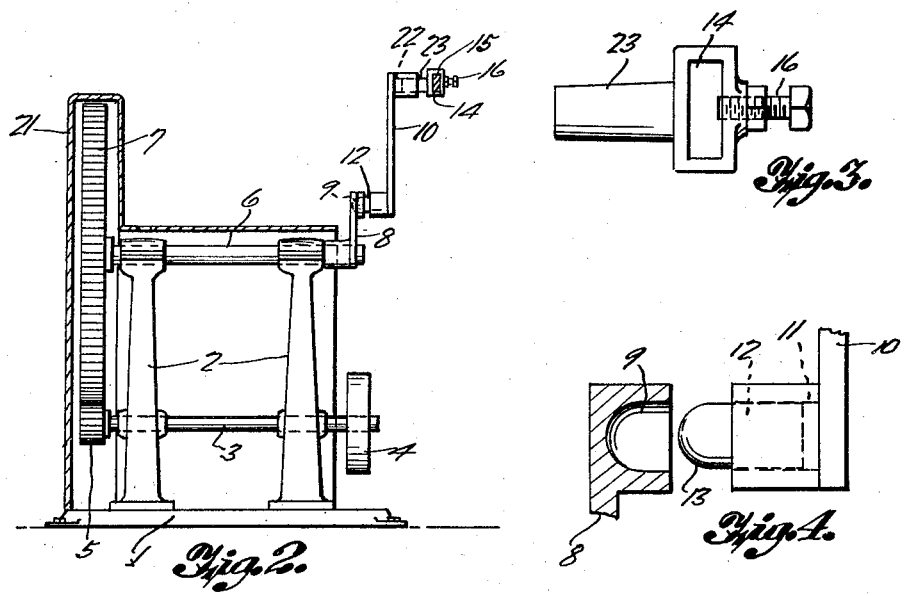
INVENTOR.
ERNEST S. CROWL
BY Adam E. Fisher
ATTORNEY.

Patented June 13, 1933

1,914,008

UNITED STATES PATENT OFFICE

ERNEST S. CROWL, OF MITCHELL, KANSAS

PUMPING UNIT

Application filed July 30, 1932. Serial No. 626,373.

This invention relates to pumping units or devices for operating pumps of any kind.

The prime object of the invention is to provide a power transmitting unit which may be readily mounted upon a pump without the interposition of a jack or the like.

With this object in view and such other objects as may be developed in the course of the specification, attention is now directed to the accompanying drawing as constituting a part of the specification, the same illustrating a practical embodiment of the invention, and wherein Figure 1 is a side elevation of an assembly comprising a conventional form of pump as operated by this improvement.

Figure 2 is a section on the line 2—2 of Figure 1.

Figure 3 is a detail of the adjustable, handle engaging arm.

Figure 4 is a detail of the proposed stud and socket connection for the ends of the pump handle link or arm with the pump handle at one end and the crank arm at the other end.

The invention comprises a base 1, upon which are anchored the spaced posts 2, through the lower portions of which are journaled the power shaft 3. A pulley 4 is rigidly mounted at one extended end of this shaft, and a small pinion gear 5 at the other end thereof. A pump drive shaft 6 is journaled through the upper ends of the posts 2, and a large drive gear 7 is rigidly mounted at one extended end thereof and placed in mesh with the pinion 5. Upon the other end of the said shaft 6 is rigidly mounted a crank 8. The outer end of this crank is cupped as shown at 9 to form a socket. An adjustable pump arm or link 10 is provided at its lower end with a socket 11 into which is seated an elongated stud 12 having a rounded outer end 13 journaled to rotate within the socket 9. The upper end of the link 10 is provided with a somewhat tapered socket 22 for rotatively engaging the rounded pin 23. The opposite end of this pin is slotted as shown at 14 to slidably or adjustably engage the handle 15 of the pump 19, and a set screw 16 is passed through the wall of this end of the pin and adapted to bear upon the handle 15 to lock the elements in any desired relative position or relation. Any suitable form of power, as the motor 17, may be used for driving the assembly, said power being transmitted through the belt 18 to the pulley 4. The connection formed by the stud 12 and socket 9 may be readily broken by merely springing the arm 10 laterally. A casing 21 may be mounted over the parts of the unit.

The use and operation of the device will be readily understood from the foregoing description.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

In a device of the kind described and embodying a shaft having a crank at one end, the outer free end of the crank having a lateral socket, a short pin having a slide-way at one end for adjustably engaging a pump handle, the opposite end of the pin being journaled, a connecting link having lateral sockets at its ends on opposite sides, whereby at one end it is placed in engagement with the journaled end of said pin, and a journaled stud having its ends rotatably engaging the sockets of the opposite end of the link and the free end of the crank, whereby the elements are operably connected.

In testimony whereof, I affix my signature.

ERNEST S. CROWL.